(12) United States Patent
Zumdome et al.

(10) Patent No.: US 12,156,492 B2
(45) Date of Patent: Dec. 3, 2024

(54) PLANTING CONTROL FOR GROUPED SEED PLACEMENT

(71) Applicant: Deere & Company, Moline, IL (US)

(72) Inventors: Lee E. Zumdome, Bettendorf, IA (US); Michael E. Frasier, Iowa City, IA (US); Elijah B. Garner, Bettendorf, IA (US); Cary S. Hubner, Geneseo, IL (US)

(73) Assignee: Deere & Company, Moline, IL (US)

( * ) Notice: Subject to any disclaimer, the term of this patent is extended or adjusted under 35 U.S.C. 154(b) by 928 days.

(21) Appl. No.: 17/197,229

(22) Filed: Mar. 10, 2021

(65) Prior Publication Data

US 2022/0287225 A1 Sep. 15, 2022

(51) Int. Cl.
| | | |
|---|---|---|
| *A01C 7/18* | (2006.01) | |
| *A01C 7/10* | (2006.01) | |
| *A01C 7/12* | (2006.01) | |
| *A01C 7/20* | (2006.01) | |
| *G05B 15/02* | (2006.01) | |

(52) U.S. Cl.
CPC ............... *A01C 7/18* (2013.01); *A01C 7/105* (2013.01); *A01C 7/12* (2013.01); *A01C 7/206* (2013.01); *G05B 15/02* (2013.01)

(58) Field of Classification Search
CPC .. A01C 7/18; A01C 7/12; A01C 7/105; A01C 7/206; G05B 15/02
See application file for complete search history.

(56) References Cited

U.S. PATENT DOCUMENTS

| | | | |
|---|---|---|---|
| 2017/0295717 A1 | 10/2017 | Brockmeier | |
| 2019/0343037 A1* | 11/2019 | Werner et al. | ......... A01C 7/102 |
| 2020/0000011 A1 | 1/2020 | Hubner et al. | |

FOREIGN PATENT DOCUMENTS

| | | | |
|---|---|---|---|
| EP | 1415523 A1 | 5/2004 | |
| EP | 3566558 A1 | 11/2019 | |
| WO | WO2012015957 A1 | 2/2012 | |

OTHER PUBLICATIONS

Extended European Search Report and Written Opinion issued in European Patent Application No. 22160713.8, dated Aug. 2, 2022, in 09 pages.
Stewart, Scott, and West TN Research & Education Center. Cold Temperatures and Rainfall after Cotton Planting. University of Tennessee Institute of Agriculture. UT Crop News Blog [online]. May 15, 2011. Retrieved from the Internet: https://news.utcrops.com/2011/05/cold-temperatures-and-rainfall-after-cotton-planting/. 2 Pages.

* cited by examiner

*Primary Examiner* — Tara Mayo
(74) *Attorney, Agent, or Firm* — Kelly, Holt & Christenson; Joseph R. Kelly (57) ABSTRACT

A row unit has a seed meter and a seed delivery system. A target seed population is obtained and a motor that drives at least one of the seed meter and the seed delivery system is intermittently pulsed to plant seeds in groupings based on machine speed and target seed population.

20 Claims, 10 Drawing Sheets

FIG. 10

PLANTING CONTROL FOR GROUPED SEED PLACEMENT

FIELD OF THE DESCRIPTION

The present description relates to agricultural machines. More specifically, the present description relates to controlling grouped seed placement, using an agricultural machine.

BACKGROUND

There is a wide variety of different types of agricultural machines that apply material to an agricultural field. Some such agricultural machines include sprayers, tillage machines with side dressing bars, air seeders, and planters that have row units, among other things.

As one example, a row unit is often mounted to a planter (as used herein the terms planting and planters include seeding and seeders) with a plurality of row units. The planter is often towed by a tractor over soil where seed is planted in the soil, using the row units. The row units on the planter follow the ground profile by using a combination of a down force assembly that imparts a down force to the row unit to push disk openers into the ground and gauge wheels to set depth of penetration of the disk openers.

Planters are sometimes operated so that crops are seeded with between 1-4 seeds in clusters of seeds at a given location. In performing such planting operations, it may be desirable to plant the seeds within each hill as close in proximity to one another as possible.

The discussion above is merely provided for general background information and is not intended to be used as an aid in determining the scope of the claimed subject matter.

SUMMARY

A row unit has a seed meter and a seed delivery system. A target seed population is obtained and a motor that drives at least one of the seed meter and the seed delivery system is intermittently pulsed to plant seeds in groupings based on machine speed and target seed population.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As discussed above, in some scenarios, it may be desirable to plant seeds in groups. The groups may be spaced based upon a desired target seed population. Some scenarios include heavy rainfall events. For instance, heavy rainfall reduces soil oxygen content, increases pressure from seedling disease pathogens, and can cause soil crusting. Soil crusting is thus commonly a concern when rain is received prior to crop emergence. In some crops, such as cotton and other crops, producers use a hill drop planting pattern so that multiple seeds are planted, in a relatively tight grouping. This enables multiple seeds to work together to push the soil up during germination, and plant emergence.

However, it can be difficult to plant multiple seeds in a relatively close proximity to one another (such as within 1-2 cm of one another), especially in scenarios where the seeds are singulated to control seed population. Some such scenarios use, as is described in greater detail below, a seed meter which includes a rotatable disc, or other seed metering component such as a bowl, that has a single row of holes, or seed apertures. Each seed aperture is used to hold a seed for singulation. It can be very difficult to plant grouped seeds within the desired proximity of one another, using a disc or bowl or other pertinent device with a single row of apertures.

The present description thus proceeds with respect to a motor control system that is used to pulse (or speed up) the RPM speed of the seed meter (and/or, where an active seed delivery system is used, the motor driving the active seed delivery system) in order to group seeds together within the desired proximity. The control system slows down the RPM speed of the motor in order to create space between seed groupings, based upon a target seed population. In another example, the meter is configured with clusters (or groupings) of seed apertures, where the groupings are separated from one another by a group separation distance spacing that is larger than the spacing between the apertures within the group. This helps in creating a gap between the groups of seeds and thus reduces the amount by which the motor speed needs to be increased and decreased to obtain the desired seed groupings.

Some systems, described below, include an active delivery system. A motor driving such a system can be slowed down to create seed groupings and then speeded up to create space between the seed groupings. If both the meter motor and the delivery system motor are used, a combination of the techniques, can be employed.

Figure 1:
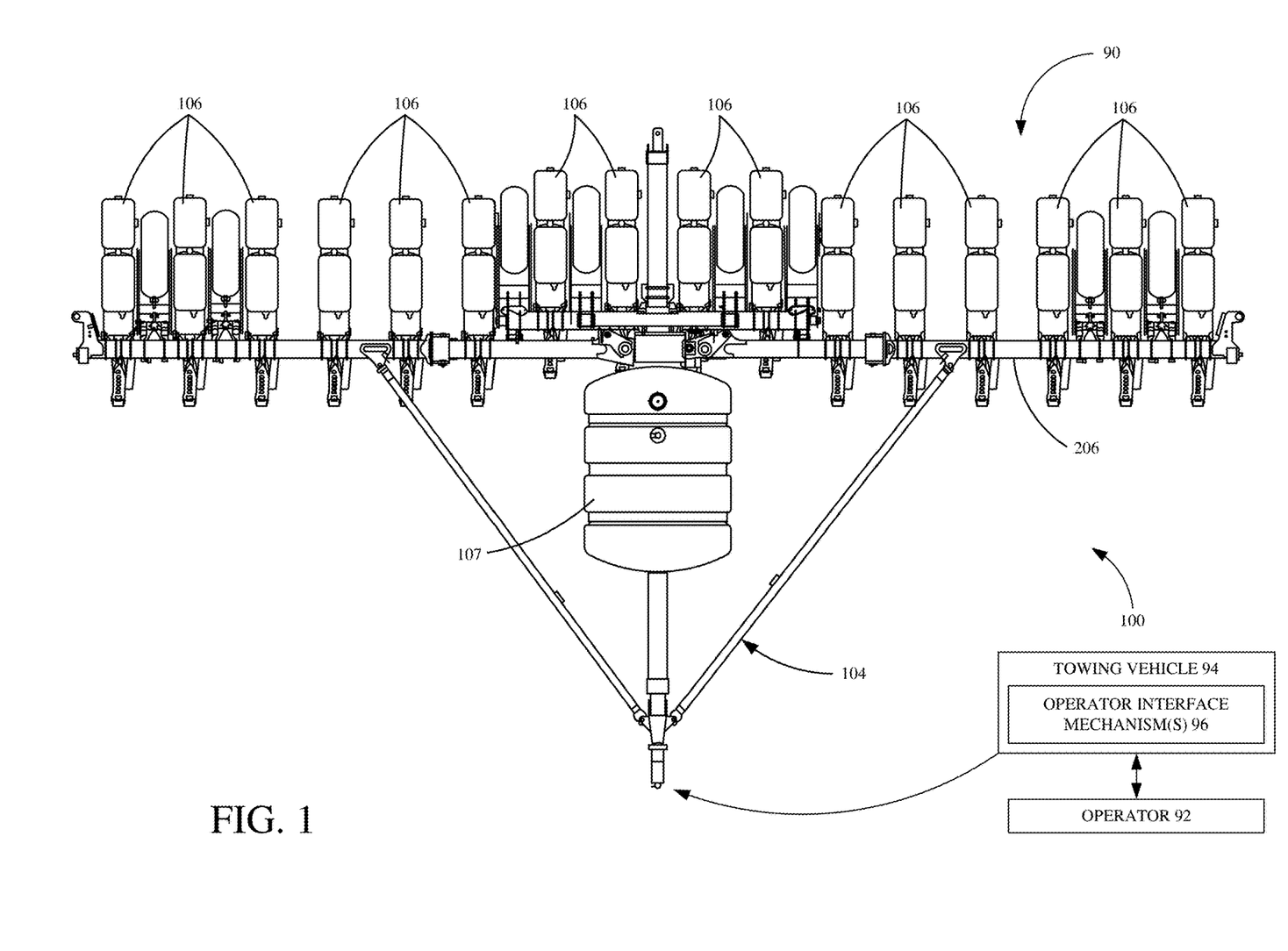
FIG. 1 is a top view of one example of a seeding or planting machine, shown in a partial pictorial and partial schematic form.

FIG. 1 is a partial pictorial, partial schematic top view of one example of an architecture 90 that includes agricultural planting machine 100, and towing vehicle 94, that is operated by operator 92. Operator 92 can illustratively interact with operator interface mechanisms 96 to manipulate and control vehicle 94, and some or all portions of machine 100.

Machine 100 is a row crop planting machine that illustratively includes a toolbar 102 that is part of a frame 104. FIG. 1 also shows that a plurality of planting row units 106 are mounted to the toolbar 102. Machine 100 can be towed behind towing vehicle 94, such as a tractor. FIG. 1 shows that material can be stored in a tank 107 and pumped through a supply line so the material can be dispensed by row units 106 in or near the rows being planted.

Figure 2:
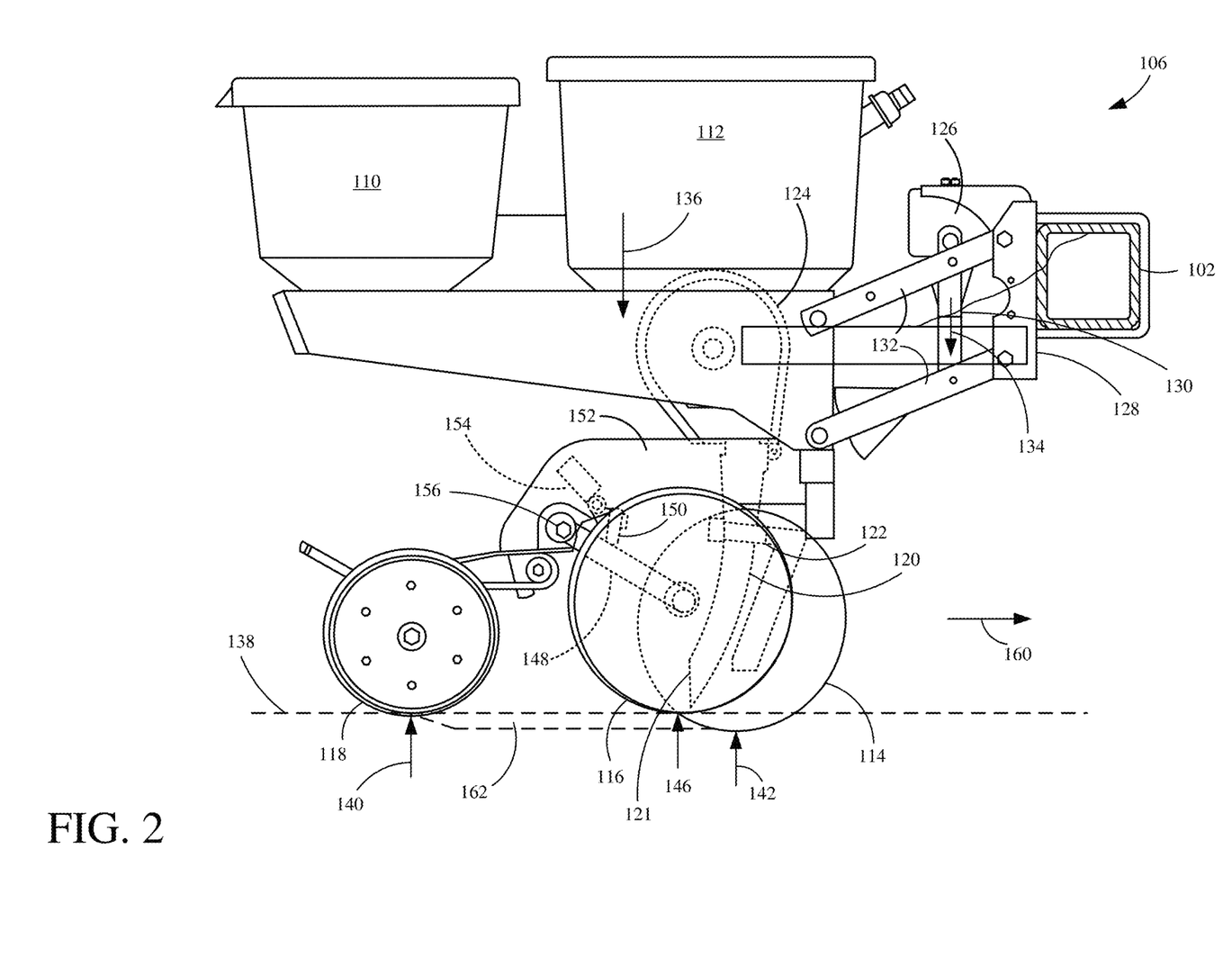
FIG. 2 is a side view showing one example of a row unit of the planting machine illustrated in FIG. 1.

FIG. 2 is a side view of one example of a row unit 106. Row unit 106 illustratively includes a chemical tank (also referred to herein as a commodity tank) 110 and a seed storage tank 112. It also illustratively includes one or more disc openers 114, a set of gauge wheels 116, and a set of closing wheels 118. Seeds from tank 112 are fed into a seed meter 124. The seed meter 124 (which is shown in more detail below) controls the rate at which seeds are dropped into a seed tube 120 or other seed delivery system, such as a brush belt or flighted belt (shown in FIGS. 6-7, respectively), from seed storage tank 112. The seeds can be sensed by a seed sensor 122.

Some parts of row unit 106 will now be discussed in more detail. First, it will be noted that there are different types of seed meters 124, and the one that is shown is shown for the sake of example only and is described in greater detail below. However, in one example, each row unit 106 need not have its own seed meter. Instead, metering or other singulation or seed dividing techniques can be performed at a central location, for groups of row units 106. The metering systems can include finger pick-up meters and/or vacuum meters (e.g., having rotatable discs, rotatable concave or bowl-shaped devices), among others. The seed delivery system can be a gravity drop system (such as seed tube 120 shown in FIG. 2) in which seeds are dropped through the seed tube 120 and fall (via gravitational force) through the seed tube and out the outlet end 121 into the seed trench 162. Other types of seed delivery systems may include assistive systems, in that they do not simply rely on gravity to move the seed from the metering system into the ground. Instead, such assistive systems actively assist the seeds in moving from the meter to a lower opening, where they exit or are deposited into the ground or trench. These can be systems that physically capture the seed and move it from the meter to the outlet end of the seed delivery system or they can be pneumatic systems that pump air through the seed tube to assist movement of the seed. The air velocity can be controlled to control the speed at which the seed moves through the delivery system. Some examples of assistive systems are described in greater detail below with respect to FIGS. 6 and 7.

A downforce actuator 126 is mounted on a coupling assembly 128 that couples row unit 106 to toolbar 102. Actuator 126 can be a hydraulic actuator, a pneumatic actuator, a spring-based mechanical actuator or a wide variety of other actuators. In the example shown in FIG. 2, a rod 130 is coupled to a parallel linkage 132 and is used to exert an additional downforce (in the direction indicated by arrow 134) on row unit 106. The total downforce (which includes the force indicated by arrow 134 exerted by actuator 126, plus the force due to gravity acting on row unit 106, and indicated by arrow 136) is offset by upwardly directed forces acting on closing wheels 118 (from ground 138 and indicated by arrow 140) and disc opener 114 (again from ground 138 and indicated by arrow 142). The remaining force (the sum of the force vectors indicated by arrows 134 and 136, minus the force indicated by arrows 140 and 142) and the force on any other ground engaging component on the row unit (not shown), is the differential force indicated by arrow 146. The differential force may also be referred to herein as the downforce margin. The force indicated by arrow 146 acts on the gauge wheels 116. This load can be sensed by a gauge wheel load sensor, which may be located anywhere on row unit 106 where it can sense that load. The gauge wheel load sensor can also be placed where it may not sense the load directly, but a characteristic indicative of that load. For example, it can be disposed near a set of gauge wheel control arms (or gauge wheel arm) 148 that movably mount gauge wheels 116 to shank 152 and control an offset between gauge wheels 116 and the discs in double disc opener 114, to control planting depth.

Arms (or gauge wheel arms) 148 illustratively abut against a mechanical stop (or arm contact member—or wedge) 150. The position of mechanical stop 150 relative to shank 152 can be set by a planting depth actuator assembly 154. Control arms 148 illustratively pivot around pivot point 156 so that, as planting depth actuator assembly 154 actuates to change the position of mechanical stop 150, the relative position of gauge wheels 116, relative to the double disc opener 114, changes, to change the depth at which seeds are planted.

In operation, row unit 106 travels generally in the direction indicated by arrow 160. The double disc opener 114 opens a furrow 162 in the soil 138, and the depth of the furrow 162 is set by planting depth actuator assembly 154, which, itself, controls the offset between the lowest parts of gauge wheels 116 and disc opener 114. Seeds are dropped through seed tube 120, into the furrow 162 and closing wheels 118 close the furrow 162 (e.g., push soil back into the furrow 162).

As the seeds are dropped through seed tube 120, they can be sensed by seed sensor 122. Some examples of seed sensor 122 are described in greater detail below. Briefly, some examples of seed sensor 122 may include an optical or reflective sensor, which includes a radiation transmitter component and a receiver component. The transmitter component emits electro-magnetic radiation and the receiver component then detects the radiation and generates a signal indicative of the presence or absence of a seed adjacent the sensors. In another example, row unit 106 may be provided with a seed firmer that is positioned to travel through the furrow 162, after seeds are placed in furrow 162, to firm the seeds in place. A seed sensor can be placed on the seed firmer and generate a sensor signal indicative of a seed. Again, some examples of seed sensors are described in greater detail below.

In the example shown in FIG. 2, where a seed tube 120 is used, the rotation of seed meter 124 can be pulsed so that it is increased to quickly drop a grouping or cluster of seeds into seed tube 120 so that they will exit the outlet end 121 of seed tube 120 in close proximity to one another. The rotation of seed meter 124 can then be slowed down so that the next cluster or grouping of seeds is spaced from the former cluster or grouping of seeds that was just dropped. This is described in more detail below.

Figure 3:
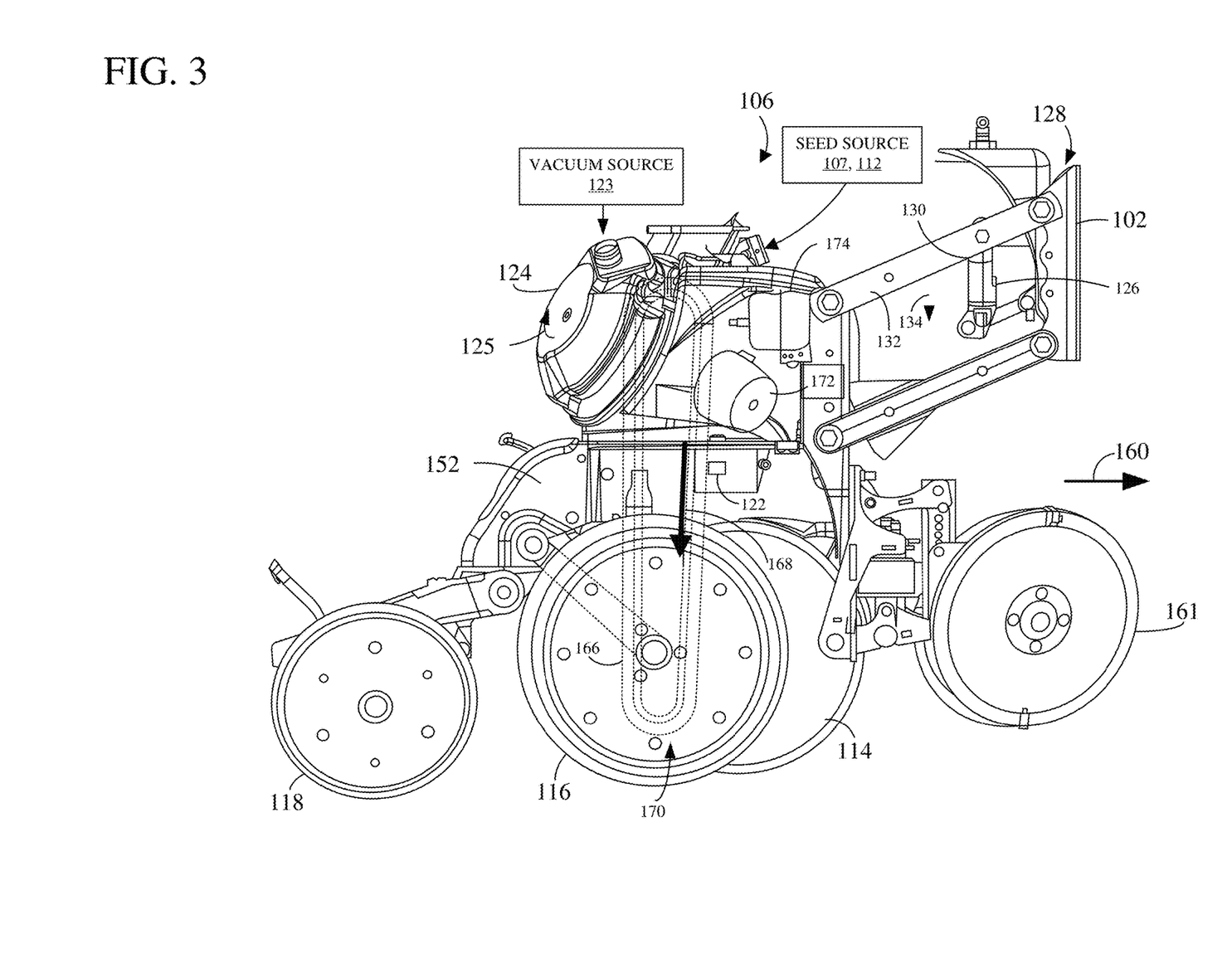
FIG. 3 is a side view showing another example of a row unit of the planting machine illustrated in FIG. 1.

FIG. 3 shows another example of a row unit 106. Some items are similar to those shown in FIG. 2, and they are similarly numbered. FIG. 3 shows that row unit 106 can also include a row cleaner 161 which can remove debris, clumps, residue, etc. from the portion of the surface where opener 114 will open the furrow. Also, FIG. 3 shows that seeds can be provided to meter 124 from a seed source which may be seed tank 112, tank 107 (shown in FIG. 1) or from another seed source.

Also, instead of the seed delivery system being a seed tube 120 as shown in FIG. 2, which relies on gravity to move the seed to the furrow 162, the seed delivery system shown in FIG. 3 is an assistive seed delivery system 166. Assistive seed delivery system 166 also illustratively has a seed sensor 122 disposed therein. Examples of assistive seed delivery system 166 are described in more detail below with respect to FIGS. 6 and 7. Briefly, assistive seed delivery system 166 includes a continuous member that captures the seeds as they leave seed meter 124 and moves them in the direction indicated by arrow 168 toward furrow 162. System 166 has an outlet end 170 where the seeds exit assistive system 166, into furrow 162, where they again reach their final resting location. FIG. 3 shows a meter motor 172 that drives rotation of meter 124 and a delivery system motor 174 that drives rotation of assistive delivery system 166. In one example, motors 172 and 174 can be individually controlled. In another example, they are controlled in coordination with one another. In yet another example, meter 124 and assistive seed delivery system 166 are both driven by a single motor. In one example, a vacuum source 123 pulls a vacuum in meter 124, as is described in more detail elsewhere, to aid in seed metering.

In one example, the seed simply drops from exit end 170 into furrow 162 under the force of gravity. In another example, however, the seed can be ejected from delivery system 166 at a greater or lesser speed than that which would be reached under the force of gravity. Similarly, it may be that the seed drops straight downward into furrow 162 from the outlet end 170. In another example, however, it may be that the seed is propelled slightly rearwardly from the outlet end 170, to accommodate for the forward motion of the row unit 106, so that the travel path of the seed is more vertical and so the seed rolls less once it reaches the furrow. Further, the seed can be ejected rearwardly and trapped against the ground by a trailing member (such as a pinch wheel) which functions to stop any rearward movement of the seed, after ejection, and to force the seed into firm engagement with the ground.

In one example, motor 172, which drives seed meter 124, can be pulsed to place seeds closely adjacent one another into the assistive delivery system 166. Assistive delivery system 166 then moves the cluster of seeds (closely spaced seeds) to the outlet end 170 where it deposits them in closely spaced relation to one another, in the furrow 162. For instance, it may be that motor 172 pulses the rotation of seed meter 124 so that three seeds are spaced closely proximate one another in seed delivery system 166, and will thus be deposited in close proximity to one another in the furrow. Between pulses, motor 172 can slow or stop the rotation of seed meter 124 so that the clusters of seeds (or groupings of seeds) are spaced from one another. In this way, row unit 106 plants clusters or groupings of seeds that are closely spaced relative to one another by an intra-group seed spacing and where the clusters or groups are spaced from other groups or clusters of seeds by a group spacing (or group separation distance) where the intra-group seed spacing is smaller than the group spacing (or group separation distance). In this example, motor 174 may drive rotation of assistive delivery system 166 so that it is at a relatively constant speed. Thus, the pulsed rotation of seed meter 124 is what forms the clusters or groupings of seeds which are deposited by seed delivery system 166 in spaced clusters or groups in the furrow.

In another example, it may be that motor 172 drives rotation of meter 124 at a constant speed and motor 174 pulses the rotation of assistive delivery 166 so that, the pulsed operation of assistive delivery system 166 acts to cluster the seeds closely relative to one another in groups or clusters. In such a scenario, motor 174 can increase the rotational speed of system 166 so that three seeds, for example, are deposited closely proximate one another in the furrow, and then slow the rotation of assistive delivery system 166 so that the next cluster is deposited in a position that is desirably spaced from the former cluster.

In yet another example, motors 172 and 174 can act in coordination with one another so that seeds are deposited in spaced clusters or groupings in the furrow.

Figure 4:
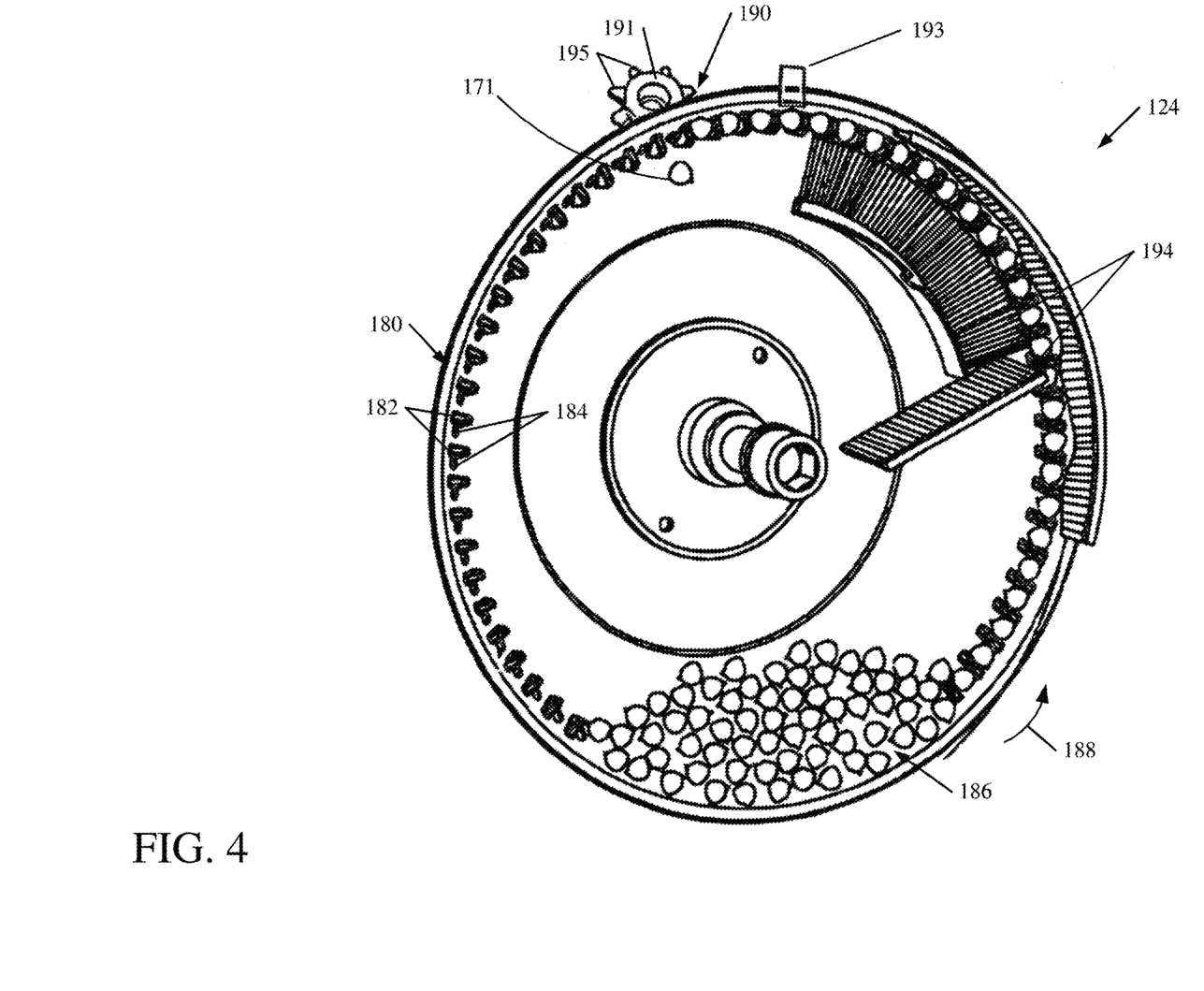
FIG. 4 is a perspective view of one example of a portion of a seed metering system.

FIG. 4 shows one example of a rotatable mechanism that can be used as part of the seed metering system (or seed meter) 124. The rotatable mechanism includes a rotatable disc, or concave element, 180. Rotatable element 180 has a cover (not shown) and is rotatably mounted relative to the frame of the row unit 106. Rotatable element 180 has a plurality of projections or tabs 182 that are closely proximate corresponding apertures 184. A seed pool 186 is formed of seeds received into meter 124 from a seed source 112, 107. The seed pool 186 is disposed generally in a lower portion of an enclosure formed by rotating mechanism 180 and its corresponding cover. Rotatable element 180 is rotatably driven by its motor 172 (such as an electric motor, a pneumatic motor, a hydraulic motor, etc.) for rotation generally in the direction indicated by arrow 188, about a hub. A pressure differential is introduced into the interior of the metering mechanism so that the pressure differential influences seeds from seed pool 186 to be drawn to apertures 184. For instance, a vacuum can be applied by vacuum source 123 to draw the seeds from seed pool 186 so that they come to rest in apertures 184, where the vacuum holds them in place. Alternatively, a positive pressure can be introduced into the interior of the metering mechanism to create a pressure differential across apertures 184 to perform the same function.

Once a seed comes to rest in (or proximate) an aperture 184, the vacuum or positive pressure differential acts to hold the seed within the aperture 184 such that the seed is carried upwardly generally in the direction indicated by arrow 188, from seed pool 186, to a seed discharge area 190. It may happen that multiple seeds are residing in an individual seed cell. In that case, a set of brushes or other members 194 that are located closely adjacent the rotating seed cells tend to remove the multiple seeds so that only a single seed is carried by each individual cell. Additionally, a seed sensor 193 can also illustratively be mounted adjacent to rotating element 180. It generates a signal indicative of seed presence.

Once the seeds reach the seed discharge area 190, the vacuum or other pressure differential is illustratively removed, and a positive seed removal wheel or knock-out wheel 191, can act to remove the seed from the seed cell. Wheel 191 illustratively has a set of projections 195 that protrude at least partially into apertures 184 to actively dislodge the seed from those apertures. When the seed is dislodged (such as seed 171), it is illustratively moved by the seed tube 120, or seed delivery system 166 (some examples of which are shown in FIGS. 3, 6 and 7) to the furrow 162 in the ground.

It will be noted that the motor that drives rotation of meter 124, or meter 124 itself, can be arranged relative to a sensor that generates a sensor signal indicative of the angular position of the motor or the meter 124 or another item from which the angular position of meter 124 can be derived. The angular position, along with the signal from seed sensor 193 and the speed of rotation of meter 124, can be used to determine the position of the seeds as they move through the planter and into the ground. This can be used to control dispensing of seeds from tank 112 and/or tank 107. The sensor can be an angle encoder, a Hall Effect sensor, an optical sensor or any of a wide variety of other sensors that generate a signal indicative of angular position.

Figure 5:
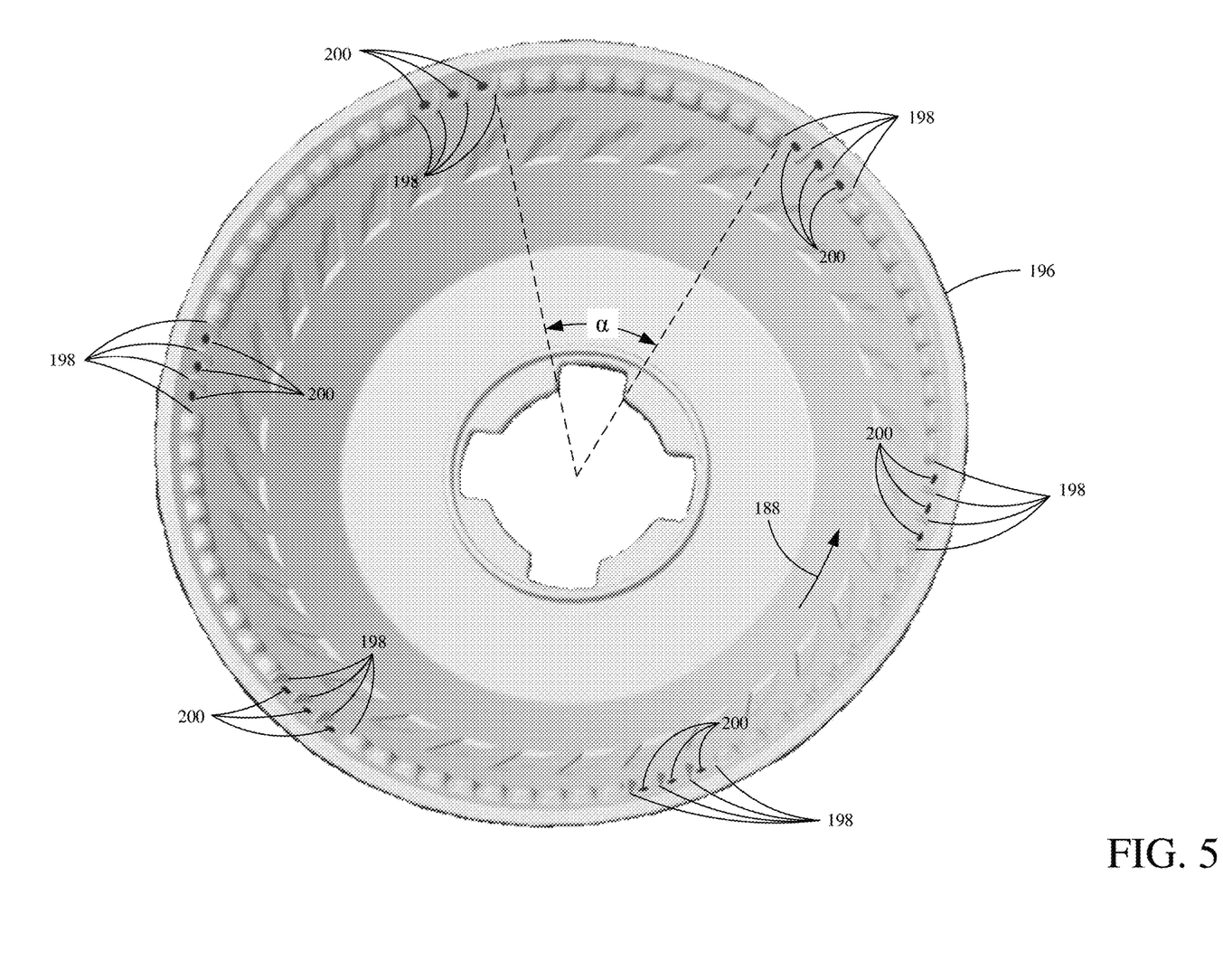
FIG. 5 is a perspective view of another example of a portion of a seed metering system.

FIG. 5 shows another example of a rotatable mechanism that includes a rotatable disc or bowl 196 that is similar to rotatable element 180 shown in FIG. 4, and that operates with a cover (not shown). Like rotatable element 180, rotatable element 196 has a plurality of tabs 198, with a tab located closely proximate aperture 200. Rotatable element 196 thus has clustered apertures 200. Apertures 200, within each cluster of apertures, are spaced closely proximate one another. However, the clusters are spaced from other clusters about the periphery of rotatable element (or disc) 196 by an angle alpha. Therefore, as disc 196 rotates, a pressure differential is introduced into the interior of the metering mechanism so that the pressure differential influences seeds from the seed pool to be drawn into apertures 200. The seeds are then rotated to a position (similar to 190 in FIG. 4) where they are removed from the apertures 200 (such as by a knockout wheel 191). In this way, the seeds delivered by rotatable mechanism 196 into the seed delivery system (whether it be a seed tube 120 or an assistive delivery system 166) are already clustered. However, even with the clustered apertures 200 on a rotatable mechanism 196 as shown in FIG. 5, the motors driving meter 124 and/or assistive delivery system 166 can still be pulsed to place the seeds in closer proximity to one another, or to increase the distance between clustered or grouped seeds, etc.

Figure 6:
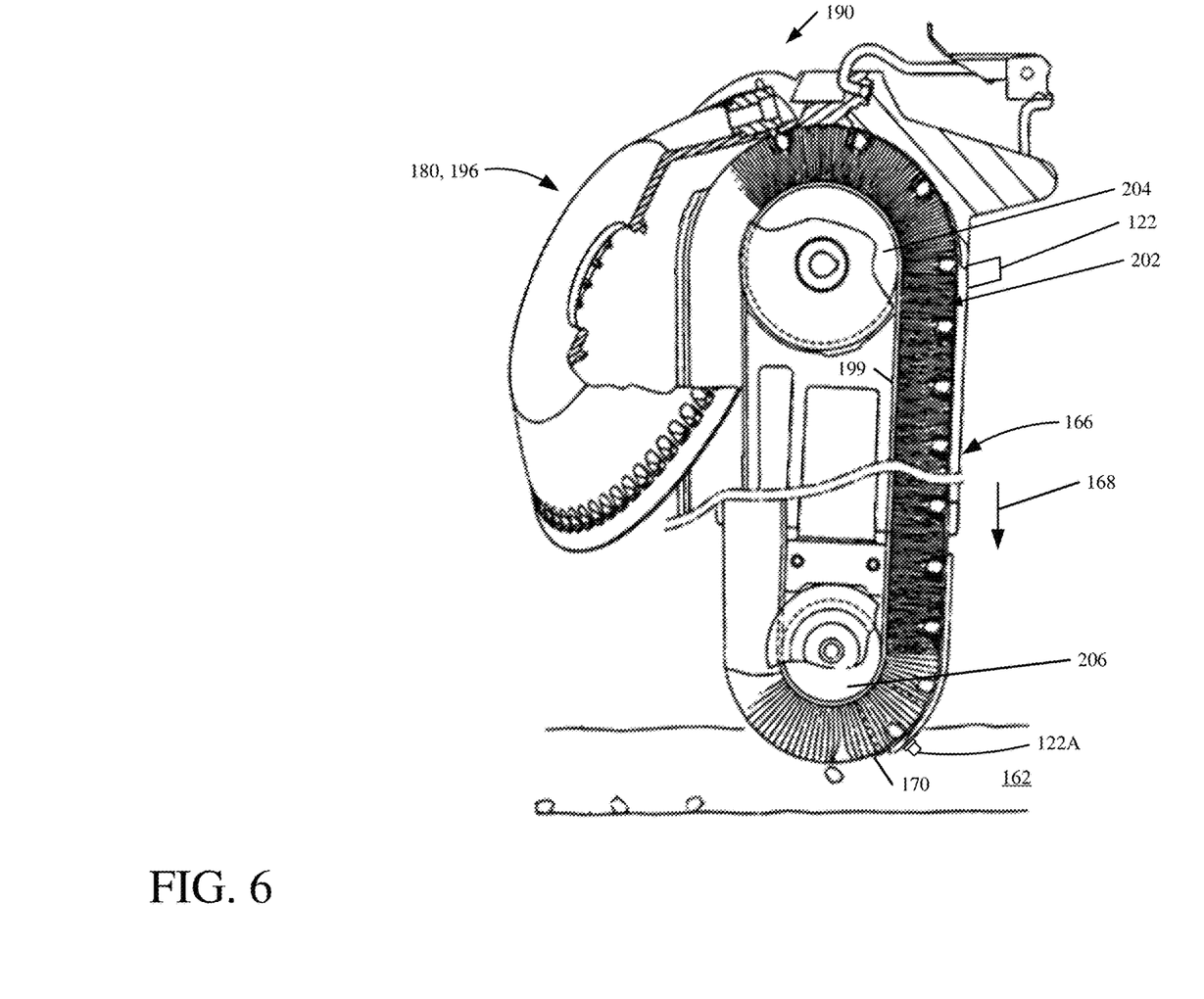
FIG. 6 shows an example of an active seed delivery system that can be used with a seed metering system.
Figure 7:
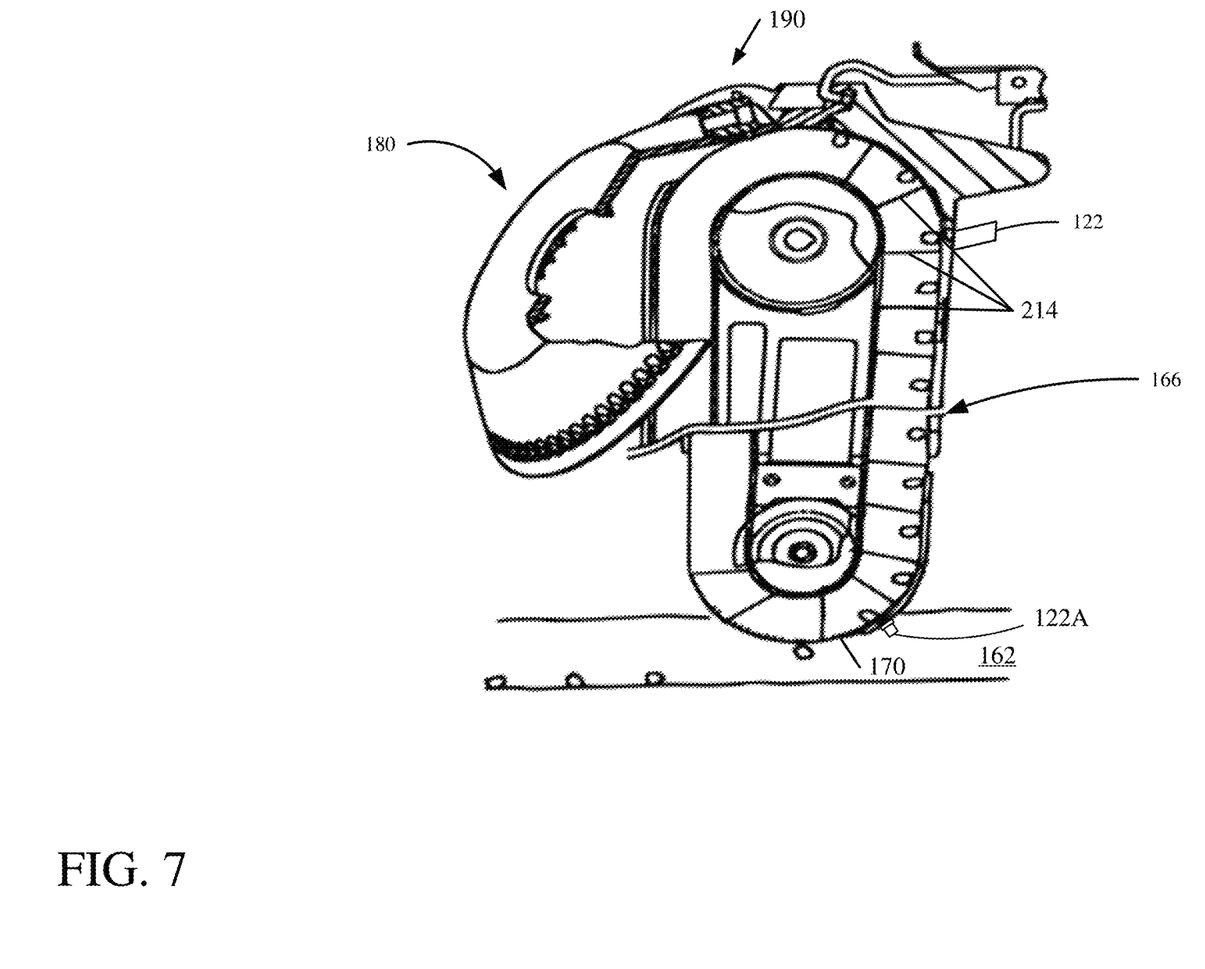
FIG. 7 shows another example of an active and delivery system that can be used with a seed metering system.

FIG. 6 shows an example of a seed metering system and a seed delivery system, in which the rotating element 180 or 196 is positioned so that its seed discharge area 190 is above, and closely proximate, seed delivery system 166. In the example shown in FIG. 6, seed delivery system 166 includes a transport mechanism, which may be a continuous mechanism such as a belt 200, with a brush that is formed of distally extending bristles 202 attached to belt 199 that act as a receiver for the seeds. Belt 199 is mounted about pulleys 204 and 206. One of pulleys 204 and 206 is illustratively a drive pulley while the other is illustratively an idler pulley. The drive pulley is illustratively rotatably driven by a conveyance motor 174, which can be an electric motor, a pneumatic motor, a hydraulic motor, etc. Belt 199 is driven generally in the direction indicated by arrow 168.

Therefore, when seeds are moved by rotating element 180, 196 to the seed discharge area 190, where they are discharged from the seed cells in rotating element 180, 196, they are illustratively positioned within the bristles 202 by the projections 182 that push the seed into the bristles 202. Seed delivery system 166 illustratively includes walls that form an enclosure around the bristles 202, so that, as the bristles 202 move in the direction indicated by arrow 168, the seeds are carried along with them from the seed discharge area 190 of the metering mechanism, to a discharge area 170 that may be above ground level, at ground level, or below ground level within a trench or furrow 162 that is generated by the furrow opener 114 on the row unit 106.

Additionally, a seed sensor 122 is also illustratively coupled to seed delivery system 166. As the seeds are moved within bristles 202, sensor 122 can detect the presence or absence of a seed. It should also be noted that while the present description will proceed as having sensors 122, and/or 193, it is expressly contemplated that, in another example, only one sensor is used. Or additional sensors can also be used. Similarly, the seed sensor 122 shown in FIG. 6 can be disposed at a different location, such as that shown at 122A. Having the seed sensor closer to where the seed is ejected from the system can reduce error in identifying the final seed location. Again, there can be multiple seed sensors, different kinds of seed sensors, and they can be located at many different locations.

Also, in one example, the motor 174 driving belt 199, or the belt 199 itself, can be configured relative to a sensor that generates a signal indicative of the angular position of the motor or belt 199. This can be used, along with the seed sensor signal and the speed of rotation of belt 199 to determine when a sensed seed or seed grouping will arrive in the furrow.

FIG. 7 is similar to FIG. 6, except that seed delivery system 166 does not include a belt with distally extending bristles. Instead, it includes a flighted belt (transport mechanism) in which a set of paddles 214 form individual chambers (or receivers), into which the seeds are dropped, from the seed discharge area 190 of the metering mechanism. The flighted belt moves the seeds from the seed discharge area 190 to the exit end 170 of the flighted belt, within the trench or furrow 162.

There are a wide variety of other types of delivery systems as well, that include a transport mechanism and a receiver that receives a seed. For instance, they include dual belt delivery systems in which opposing belts receive, hold, and move seeds to the furrow, a rotatable wheel that has fingers or other objects, which catch seeds from the metering system and move them to the furrow, multiple transport wheels that operate to transport the seed to the furrow, and an auger, among others. The present description will proceed with respect to an endless member (such as a brush belt, a flighted belt) and/or a seed tube, but many other delivery systems are contemplated herein as well.

Figure 8:
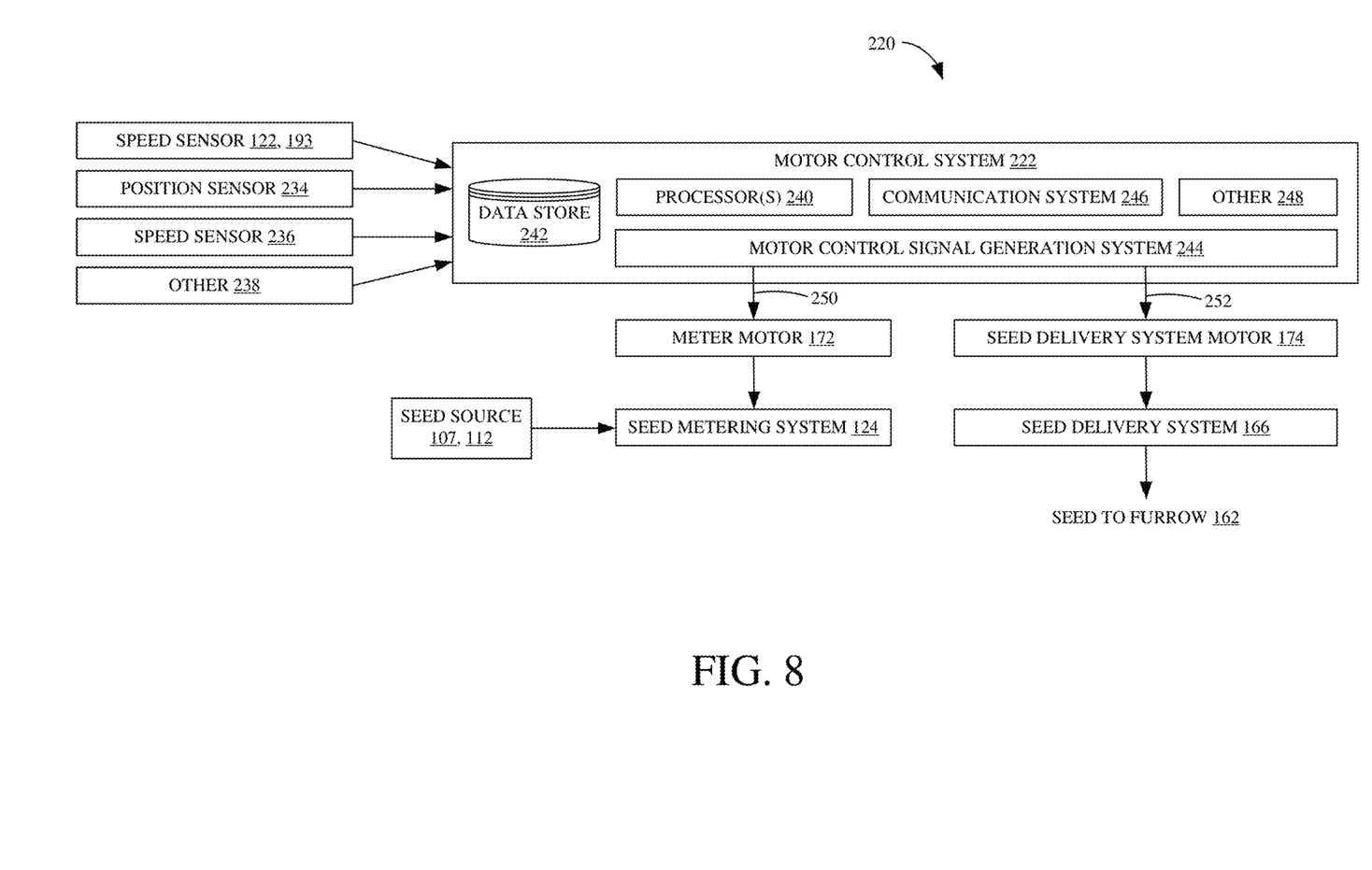
FIG. 8 is a block diagram showing one example of a motor control system architecture.

FIG. 8 is a block diagram of one example of a motor control architecture 220. Architecture 220 illustratively includes motor control system 222 that generates control signals for controlling meter motor 172 and/or seed delivery system motor 174. In the architecture shown in FIG. 8, motors 172 and 174 drive seed metering system 124 and seed delivery system 166. Seed metering system 124, as discussed above, receives seeds from seed source 107, 112, singulates or meters those seeds, and provides the singulated or metered seeds to seed delivery system 166. The description of FIG. 8 proceeds with respect to seed delivery system 166 being an assistive delivery system, but it could also be seed tube 120, in which case no seed delivery system motor 174 need be provided.

Figure 9:
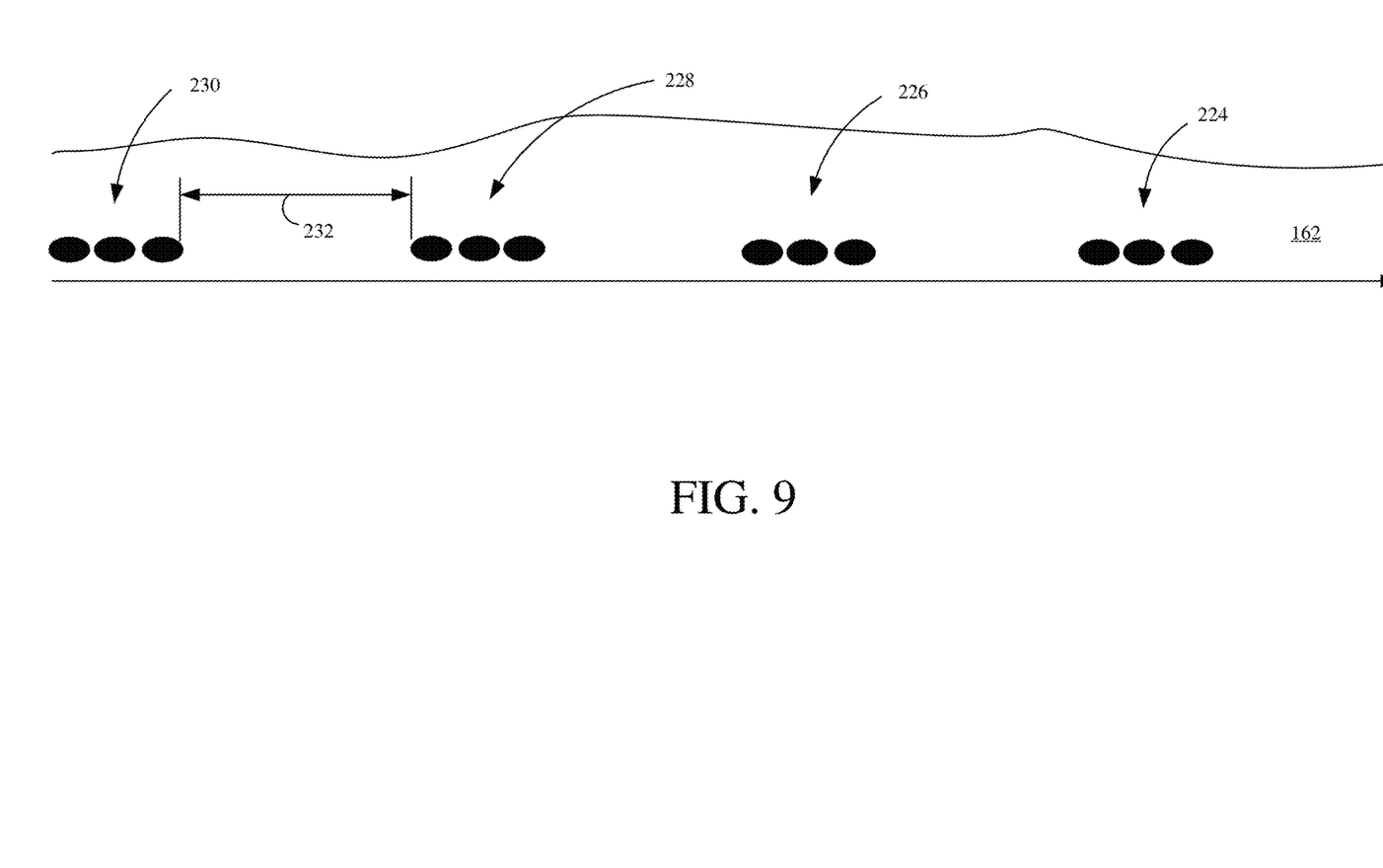
FIG. 9 is a flow diagram illustrating one example of the operation of the motor control system architecture shown in FIG. 8.

In the example discussed herein, motor control system 222 generates motor control signals to control motors 172 and/or 174 so that seeds are delivered to the furrow by seed delivery system 166 as grouped or clustered seeds. For instance, the seeds may be delivered in groups or clusters of two, three, four seeds or more. Those groups or clusters are illustratively separated from one another by a group separation distance. FIG. 9 shows one example of this.

In the example shown in FIG. 9, furrow 162 is planted with a plurality of different groups or clusters of seeds identified as groups or clusters 224, 226, 228 and 230. In the example shown in FIG. 9, each group or cluster has three seeds. The clusters are separated by a group separation distance designated by arrow 232. The separation distance, which separates the clusters, can be selected or controlled based on a wide variety of different criteria, such as crop type, hybrid, soil conditions, among a wide variety of other criteria. In the example discussed herein, motor control system 222 generates motor control signals for controlling meter motor 172 and/or seed delivery system motor 174 so that the desired number of seeds are closely spaced relative to one another (such as within two centimeters of one another, etc.) in each cluster 224-230 (the intra-cluster seed spacing). The motors are also controlled so that the clusters are separated by one another by a desired group separation distance 232.

Thus, motor control system 220 can receive an input from one or more seed sensors 122, 193, a position sensor 234, a speed sensor 236 and/or a wide variety of other items 238. Position sensor 234 may be a GPS receiver or another position sensor that identifies a geographic location of row unit 106 in the field. Thus, if the seed clusters 224-230 are to be placed at pre-defined locations, then motor control system 222 can control motors 172 and/or 174 to deposit seeds in clusters at the desired, pre-defined locations. In another example, it may be that there are no pre-defined locations, but the locations where the seeds are actually deposited is to be captured by motor control system 222 and sent to another system for mapping. In that case, the position identified by position sensor 234, where the different clusters 224-230 are deposited, can be saved and forwarded to a mapping system or another suitable system.

Speed sensor 236 can provide one or more speed signals indicative of a variety of different speeds. In one example, speed sensor 236 can sense the rotational speed of motor 172 and/or motor 174. It can do that by sensing the speed of the output of the drive shaft of the motor, by sensing the speed of the rotatable element (such as rotatable element 180, 196, or the continuous belt in the assistive seed delivery system 166, etc.). Speed sensor 236 can also include a sensor that senses a speed indicative of the ground speed of row unit 106. These speed signals can be used to control motors 172 and/or 174 to place the seed or groupings at the desired locations, or to map the locations where the seed or groupings are placed. Similarly, predictive calculations can be performed based on knowledge of future commanded operations. The predictive calculations can be used to control motors 172 and/or 174 to place the seed or groupings at desired locations or to map the locations where the seed or groupings are placed.

In the example shown in FIG. 8, motor control system 222 illustratively includes one or more processors 240, data store 242, motor control signal generation system 244, communication system 246, and it can include a wide variety of other items 248. Communication system 246 illustratively enables communication among the various items in architecture 220, and it can enable communication with external systems (such as remote systems). Thus, communication system 246 can be configured to communicate over a controller area network (CAN) bus where a CAN bus is implemented. It can be configured to communicate over a local area network, a wide area network, a near field communication network, a cellular communication network, or any of a wide variety of other networks or combinations of networks, where such communication is to be used.

Motor control signal generation system 244 can obtain information, such as the target seed spacing or seed population (e.g., seed rate), a desired number of seeds per seed cluster or seed grouping, among other criteria. This information can be received through communication system 246 based on an operator input. System 244 can obtain or receive the data from data store 242, or a remote data store, or it can be received in other ways.

Motor control signal generation system 244 also illustratively receives inputs from one or more of the sensors 122, 193, 234, 236 and/or 238. Based on these signals, motor control signal generation system 244 can generate a meter motor control signal 250, and/or a seed delivery system motor control signal 252. Signals 250 and 252 can be generated to pulse the operation of motors 172 and/or 174 so that the seeds are ejected by seed metering system 124 and/or seed delivery system 166 in clusters or groups. System 244 can generate control signals 250 and 252 to control motors 172 and/or 174 independently of one another, or in correlation to one another. For instance, when the system pulses the speed of meter motor 172, it may also pulse the speed of seed delivery system motor 174. Alternatively, it may pulse the speed of motor 172 while retaining the speed of motor 174 relatively constant. These and other control mechanisms can be used to control the speeds of motors 172 and 174 so that the seeds are planted in seed groupings or clusters 224-230, separated by a desired group separation distance 232.

Figure 10:
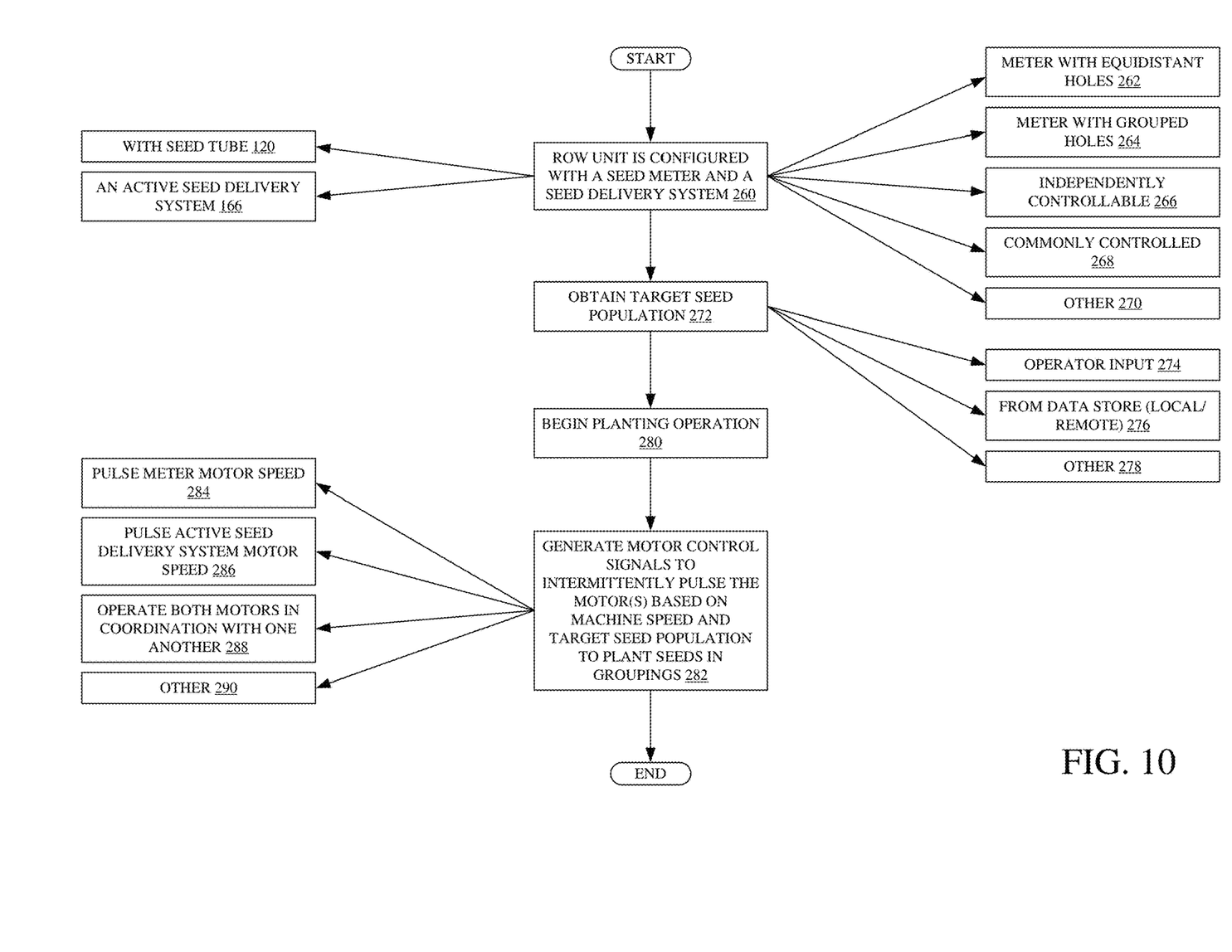
FIG. 10 shows one example of grouped seeds.

FIG. 10 is a flow diagram illustrating one example of the operation of architecture 220 illustrated in FIG. 8, in planting seeds in seed groupings or seed clusters. It is first assumed that row unit 206 is configured with a seed meter 126 and a seed delivery system 120, 166. This is indicated by block 260 in the flow diagram of FIG. 10. In one example, the seed delivery system is a seed tube 120. In another example, it is an active seed delivery system 166. The seed meter can be a meter with equidistant apertures about its circumference (such as that shown in FIG. 4) as indicated by block 262 in the flow diagram of FIG. 10. It can also be a seed meter with grouped apertures (such as that shown in FIG. 5) as indicated by block 264 in the flow diagram of FIG. 5. When the seed delivery system is an active seed delivery system or an assistive seed delivery system 166, then the seed meter 124 and the active delivery system 166 can have independently controllable motors, as indicated by block 266. The motors can be controlled in correlation with one another as indicated by block 268. Similarly, the row unit can be configured in other ways as well, and this is indicated by block 270 in the flow diagram of FIG. 10.

At some point, motor control signal generation system 244 obtains a target seed population. This is indicated by block 272 in the flow diagram of FIG. 10. The target seed population can identify the desired spacing between seed clusters or seed groupings, and/or it can be a raw seed population per acre, among other things. The target seed population can be received by operator input 274, or from a data store (either local data store 242 or a remote data store) as indicated by block 276. The target seed population can define other seed population parameters and be received or obtained in other ways as well. This is indicated by block 278.

Row unit 106 then begins the planting operation. This is indicated by block 280 in the flow diagram of FIG. 10. Motor control signal generation system 244 intermittently pulses (speeds up and slows down) the motors 172 and/or 174, based upon the machine ground speed and target seed population, to plant the seeds in groupings or clusters separated by a desired group separation distance. Generating the motor control signals to pulse the motors in this way is indicated by block 282 in the flow diagram of FIG. 10. In one example, system 244 generates control signals to pulse the meter motor 172, as indicated by block 284. In another example, system 244 generates control signals to pulse the seed delivery system motor 174, as indicated by block 286. In yet another example, system 244 controls motors 172 and 174 in coordination with one another, as indicated by block 288. The motors can be controlled based on other inputs and in other ways as well, and this is indicated by block 290.

It can thus be seen that the present description describes a system and control mechanism that controls the speed of motors on row unit 106 to plant seeds in clusters or seed groupings. It will be noted that this motor control mechanism can be used without receiving substantially any sensor signals (such as seed sensor signals, machine speed signals, etc.) and the motor speeds can simply be pulsed. However, the clusters can be more accurately placed relative to one another when some sensor signals are received, such as a machine speed sensor. In addition, with additional sensor inputs (such as seed sensors, machine position, etc.), the clusters can be placed in desired locations within a field, or their locations can be tracked and mapped, among other things.

It should also be noted that the different examples described herein can be combined in different ways. That is, parts of one or more examples can be combined with parts of one or more other examples.

Example 1 is a planting machine, comprising:
  a seed meter that receives seeds, at a seed meter input, from a seed source, and rotates to provide the seeds at a seed meter output;
  a seed meter motor that drives rotation of the seed meter;
  a seed delivery system that receives the seeds, from the seed meter output, and outputs the seeds at an outlet end of the seed delivery system, into a furrow; and
  a motor control system that generates a motor control signal to control the seed meter motor to intermittently change motor speed of the seed meter motor to provide seed groupings, of a predefined number of seeds, to the seed delivery system, the predefined number of seeds in the seed groupings being spaced closely relative to one another by an intra-group seed spacing and the seed groupings being separated from one another by a group separation distance that is greater than the intra-group seed spacing.

Example 2 is the planting machine of any or all previous examples wherein the seed delivery system comprises:
  a seed tube.

Example 3 is the planting machine of any or all previous examples wherein the seed meter comprises:
  a rotatable element, driven by the seed meter motor, that has groupings of seed apertures defined therein, each seed aperture carrying a seed from a seed pool to the seed meter output, the seed apertures in each grouping of seed apertures being separated from one another by a first distance and the groupings of seed apertures being separated from one another by a second distance that is larger than the first distance.

Example 4 is the planting machine of any or all previous examples wherein the seed meter comprises:
  a rotatable element, driven by the meter motor, that has seed apertures defined therein, each seed aperture carrying a seed from a seed pool to the seed meter output, the seed apertures being equidistant from one another.

Example 5 is the planting machine of any or all previous examples wherein the seed delivery system comprises:
  an assistive seed delivery system that moves the seeds to the outlet end of the seed delivery system.

Example 6 is the planting machine of any or all previous examples wherein the assistive seed delivery system comprises:
  a continuous member that receives the seed from the seed meter output and rotates to move the seeds to the outlet end of the seed delivery system.

Example 7 is the planting machine of any or all previous examples wherein the assistive seed delivery system comprises:
  a seed delivery system motor that drives rotation of the continuous member.

Example 8 is the planting machine of any or all previous examples wherein the motor control system generates motor control signals to control the seed delivery system motor to move the seed groupings to the outlet end of the seed delivery system and be expelled from the seed delivery system into the furrow at the group separation distance.

Example 9 is the planting machine of any or all previous examples and further comprising:
  a machine speed sensor that generates a machine speed signal indicative of a ground speed of the planting machine, the motor control system generating the motor control signals based on the machine speed signal.

Example 10 is the planting machine of any or all previous examples and further comprising:
  a seed sensor that generates a seed signal indicative of seed presence in the planting machine, the motor control system generating the motor control signals based on the seed signal.

Example 11 is the planting machine of any or all previous examples and further comprising:
  a machine position sensor that generates a machine position signal indicative of a geographic position of the planting machine, the motor control system generating the motor control signals based on the machine position signal.

Example 12 is the planting machine of any or all previous examples and further comprising:
  a communication system that sends a position corresponding to each seed grouping to a remote system based on the machine position signal.

Example 13 is a method of controlling a planting machine, comprising:
  receiving seeds, at an input of a seed meter, from a seed source;
  driving rotation of the seed meter, with a seed meter motor, to provide the seeds at a seed meter output;
  receiving the seeds at a seed delivery system input of a seed delivery system, from the seed meter output;
  generating a motor control signal to control the seed meter motor to intermittently change motor speed of the seed meter motor to provide seed groupings, of a predefined number of seeds, to the seed delivery system, the predefined number of seeds in the seed groupings being spaced closely relative to one another by an intra-group seed spacing and the seed groupings being separated from one another by a group separation distance that is greater than the intra-group seed spacing; and
  outputting the seed groupings at an outlet end of the seed delivery system, into a furrow.

Example 14 is the method of any or all previous examples wherein the seed delivery system comprises an assistive seed delivery system and further comprising:
  moving the seeds, with the assistive seed delivery system, to the outlet end of the seed delivery system.

Example 15 is the method of any or all previous examples wherein the assistive seed delivery system comprises a continuous member that receives the seed from the seed meter output and wherein further comprising:
  driving rotation of the continuous member, with a seed delivery system motor, to move the seeds to the outlet end of the seed delivery system.

Example 16 is the method of any or all previous examples wherein generating the motor control signals comprises:
  generating motor control signals to control the seed delivery system motor to move the seed groupings to the outlet end of the seed delivery system and be expelled from the seed delivery system into the furrow at the group separation distance.

Example 17 is the method of any or all previous examples and further comprising:
sensing a machine speed of the planting machine; and
generating a machine speed signal indicative of a ground speed of the planting machine, wherein generating the motor control signals comprises generating the motor control signals based on the machine speed signal.

Example 18 is the method of any or all previous examples and further comprising:
sensing a seed in the planting machine; and
generating a seed signal indicative of the sensed seed in the planting machine, wherein generating the motor control signals comprises generating the motor control signals based on the seed signal.

Example 19 is the method of any or all previous examples and further comprising:
sensing a geographic position of the planting machine; and
generating a machine position signal indicative of the geographic position of the planting machine, wherein generating the motor control signals comprises generating the motor control signals based on the machine position signal.

Example 20 is a method of controlling a planting machine, comprising:
receiving seeds, at an input of a seed meter, from a seed source;
driving rotation of the seed meter, with a seed meter motor, to provide the seeds at a seed meter output;
receiving the seeds at a seed delivery system input of an assistive seed delivery system, from the seed meter output;
driving rotation of the continuous member, with a seed delivery system motor, to move the seeds to the outlet end of the seed delivery system;
generating a motor control signal to control at least one of the seed meter motor and the seed delivery system motor to intermittently change motor speed to provide seed groupings, of a predefined number of seeds, the predefined number of seeds in the seed groupings being spaced closely relative to one another by an intra-group seed spacing and the seed groupings being separated from one another by a group separation distance that is greater than the intra-group seed spacing; and
outputting the seed groupings at an outlet end of the seed delivery system, into a furrow.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A planting machine, comprising:
a seed meter that receives seeds, at a seed meter input, from a seed source, and rotates to provide the seeds at a seed meter output;
a seed meter motor that drives rotation of the seed meter;
a seed delivery system that receives the seeds, from the seed meter output, and outputs the seeds at an outlet end of the seed delivery system, into a furrow; and
a motor control system that generates a motor control signal to control the seed meter motor to intermittently change motor speed of the seed meter motor to provide a plurality of consecutive seed groupings to the seed delivery system, each seed grouping of the plurality of consecutive seed groupings having a same number of seeds, the number of seeds in the seed groupings being spaced closely relative to one another by an intra-group seed spacing and the seed groupings being separated from one another by a group separation distance that is greater than the intra-group seed spacing.

2. The planting machine of claim 1 wherein the seed delivery system comprises: a seed tube.

3. The planting machine of claim 1 wherein the seed meter comprises:
a rotatable element, driven by the seed meter motor, that has groupings of seed apertures defined therein, each seed aperture carrying a seed from a seed pool to the seed meter output, the seed apertures in each grouping of seed apertures being separated from one another by a first distance and the groupings of seed apertures being separated from one another by a second distance that is larger than the first distance.

4. The planting machine of claim 1 wherein the seed meter comprises:
a rotatable element, driven by the meter motor, that has seed apertures defined therein, each seed aperture carrying a seed from a seed pool to the seed meter output, the seed apertures being equidistant from one another.

5. The planting machine of claim 1 wherein the seed delivery system comprises:
an assistive seed delivery system that moves the seeds to the outlet end of the seed delivery system.

6. The planting machine of claim 5 wherein the assistive seed delivery system comprises:
a continuous member that receives the seed from the seed meter output and rotates to move the seeds to the outlet end of the seed delivery system.

7. The planting machine of claim 6 wherein the assistive seed delivery system comprises:
a seed delivery system motor that drives rotation of the continuous member.

8. The planting machine of claim 7 wherein the motor control system generates motor control signals to control the seed delivery system motor to move the seed groupings to the outlet end of the seed delivery system and be expelled from the seed delivery system into the furrow at the group separation distance.

9. The planting machine of claim 1 and further comprising:
a machine speed sensor that generates a machine speed signal indicative of a ground speed of the planting machine, the motor control system generating the motor control signals based on the machine speed signal.

10. The planting machine of claim 1 and further comprising:
a seed sensor that generates a seed signal indicative of seed presence in the planting machine, the motor control system generating the motor control signals based on the seed signal.

11. The planting machine of claim 1 and further comprising:
a machine position sensor that generates a machine position signal indicative of a geographic position of the planting machine, the motor control system generating the motor control signals based on the machine position signal.

12. The planting machine of claim 11 and further comprising:
a communication system that sends a position corresponding to each seed grouping to a remote system based on the machine position signal.

13. A method of controlling a planting machine, comprising:
receiving seeds, at an input of a seed meter, from a seed source;
driving rotation of the seed meter, with a seed meter motor, to provide the seeds at a seed meter output;
receiving the seeds at a seed delivery system input of a seed delivery system, from the seed meter output;
generating a motor control signal to control the seed meter motor to intermittently change motor speed of the seed meter motor to provide a first seed grouping and a consecutive second seed grouping to the seed delivery system, the first seed grouping and the second seed grouping having a same number of seeds, the number of seeds in the seed groupings being spaced closely relative to one another by an intra-group seed spacing and the seed groupings being separated from one another by a group separation distance that is greater than the intra-group seed spacing; and
outputting the seed groupings at an outlet end of the seed delivery system, into a furrow.

14. The method of claim 13 wherein the seed delivery system comprises an assistive seed delivery system and further comprising:
moving the seeds, with the assistive seed delivery system, to the outlet end of the seed delivery system.

15. The method of claim 14 wherein the assistive seed delivery system comprises a continuous member that receives the seed from the seed meter output and wherein further comprising:
driving rotation of the continuous member, with a seed delivery system motor, to move the seeds to the outlet end of the seed delivery system.

16. The method of claim 15 wherein generating the motor control signals comprises:
generating motor control signals to control the seed delivery system motor to move the first and second seed groupings to the outlet end of the seed delivery system and be expelled from the seed delivery system into the furrow at the group separation distance.

17. The method of claim 13 and further comprising:
sensing a machine speed of the planting machine; and
generating a machine speed signal indicative of a ground speed of the planting machine, wherein generating the motor control signals comprises generating the motor control signals based on the machine speed signal.

18. The method of claim 13 and further comprising:
sensing a seed in the planting machine; and
generating a seed signal indicative of the sensed seed in the planting machine, wherein generating the motor control signals comprises generating the motor control signals based on the seed signal.

19. The method of claim 13 and further comprising:
sensing a geographic position of the planting machine; and
generating a machine position signal indicative of the geographic position of the planting machine, wherein generating the motor control signals comprises generating the motor control signals based on the machine position signal.

20. A method of controlling a planting machine, comprising:
receiving seeds, at an input of a seed meter, from a seed source;
driving rotation of the seed meter, with a seed meter motor, to provide the seeds at a seed meter output;
receiving the seeds at a seed delivery system input of an assistive seed delivery system, from the seed meter output;
driving rotation of the continuous member, with a seed delivery system motor, to move the seeds to the outlet end of the seed delivery system;
generating a motor control signal to control at least one of the seed meter motor and the seed delivery system motor to intermittently change motor speed to provide a first seed grouping, a second seed grouping, a third seed grouping, and a fourth seed grouping, each of the first, second, third and fourth seed groupings including a plurality of seeds;
outputting the first, second, third, and fourth seed groupings at an outlet end of the seed delivery system, into a furrow;
wherein the first seed grouping is spaced from the second seed grouping, in the furrow, by a first group separation gap having a first group separation distance, the second seed grouping being spaced from the third seed grouping, in the furrow, by a second group separation gap having a second group separation distance, and the third seed grouping being spaced from the fourth seed grouping, in the furrow, by a third group separation gap having a third group separation distance; and
wherein the first group gap is spaced apart from the second group separation gap by a first distance and the second group separation gap is spaced apart from the third group separation gap by a second distance, the first distance and the second distance approximately equal.

* * * * *